US011334990B2

(12) United States Patent
Yamada (10) Patent No.: US 11,334,990 B2
(45) Date of Patent: May 17, 2022

(54) INFORMATION PROCESSING APPARATUS, INFORMATION PROCESSING METHOD, AND PROGRAM

(71) Applicant: FUJIFILM Corporation, Tokyo (JP)

(72) Inventor: Kenta Yamada, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/660,749

(22) Filed: Oct. 22, 2019

(65) Prior Publication Data
US 2020/0134819 A1 Apr. 30, 2020

(30) Foreign Application Priority Data

Oct. 29, 2018 (JP) .............................. JP2018-202950

(51) Int. Cl.
*G06T 7/00* (2017.01)
*G06N 20/00* (2019.01)

(52) U.S. Cl.
CPC ........... *G06T 7/0012* (2013.01); *G06N 20/00* (2019.01); *G06T 2207/10081* (2013.01); *G06T 2207/10088* (2013.01); *G06T 2207/20081* (2013.01); *G06T 2207/30008* (2013.01)

(58) Field of Classification Search
CPC .......... G06N 20/00; G06N 3/08; G06N 20/10; G06N 7/005; G06N 3/0454; G06N 3/008; G06N 3/0445; G06N 3/084; G06N 20/20; G06N 3/006; G06N 3/04; G06N 3/0472; G06N 5/00; G06N 5/003; G06N 5/025; G06N 5/04; G06N 7/00; G06T 19/20; G06T 2207/20081

USPC ......................................................... 382/128
See application file for complete search history.

(56) References Cited

U.S. PATENT DOCUMENTS

| 5,463,548 | A | 10/1995 | Asada et al. |
| 5,622,171 | A | 4/1997 | Asada et al. |
| 7,809,173 | B2 | 10/2010 | Kitamura et al. |
| 8,837,791 | B2 | 9/2014 | Plakas et al. |

(Continued)

FOREIGN PATENT DOCUMENTS

| JP | H04332548 | 11/1992 |
| JP | 2007128127 | 5/2007 |

(Continued)

OTHER PUBLICATIONS

"Office Action of Japan Counterpart Application" with English translation thereof, dated Dec. 21, 2021, p. 1-p. 4.

*Primary Examiner* — Ajibola A Akinyemi
(74) *Attorney, Agent, or Firm* — JCIPRNET (57) ABSTRACT

Provided are an information processing apparatus, an information processing method, and a program capable of accurately extracting a target region from a medical image. An information processing apparatus includes an extraction unit that extracts information indicating a physique of a subject from an image acquired by imaging the subject, a specification unit that specifies a group into which the subject is classified by using the information indicating the physique of the subject extracted by the extraction unit, and a generation unit that generates a learned model for each group through machine learning using, as learning data, image data indicating a medical image acquired by imaging the subject for each group and information indicating a region extracted from the medical image.

9 Claims, 4 Drawing Sheets

(56) References Cited

U.S. PATENT DOCUMENTS

| | | | |
|---|---|---|---|
| 9,396,534 B2 | 7/2016 | Kutsuna et al. | |
| 2009/0079743 A1* | 3/2009 | Pearson | G06T 15/205 |
| | | | 345/473 |
| 2009/0080780 A1* | 3/2009 | Ikeda | G06K 9/00369 |
| | | | 382/209 |
| 2012/0170856 A1* | 7/2012 | Yamaguchi | G06F 16/583 |
| | | | 382/224 |
| 2016/0140720 A1* | 5/2016 | Naito | A61B 6/5282 |
| | | | 382/132 |
| 2017/0322484 A1 | 11/2017 | Erhard | |
| 2020/0027244 A1* | 1/2020 | Ueda | G06N 3/08 |
| 2020/0315555 A1* | 10/2020 | Sugihara | A61B 6/541 |

FOREIGN PATENT DOCUMENTS

| | | |
|---|---|---|
| JP | 2009070099 | 4/2009 |
| JP | 2012130667 | 7/2012 |
| JP | 2015198928 | 11/2015 |
| JP | 2017534401 | 11/2017 |

* cited by examiner

INFORMATION PROCESSING APPARATUS, INFORMATION PROCESSING METHOD, AND PROGRAM

CROSS-REFERENCE TO RELATED APPLICATION

This application claims priority under 35 USC 119 from Japanese Patent Application No. 2018-202950 filed on Oct. 29, 2018, the disclosure of which is incorporated by reference herein in its entirety.

BACKGROUND OF THE INVENTION

1. Field of the Invention

The present disclosure relates to an information processing apparatus, an information processing method, and a program.

2. Description of the Related Art

In the related art, a face detection method of detecting a face included in an input image while changing an inclination of a face to be detected is disclosed (see JP2007-128127A). In the face detection method, face detection is performed according to the inclination of the face to be detected through any detection process of a first detection process and a second detection process.

An image processing device that detects a face from the input image is disclosed by using the face detection method according to the kind of the input image is disclosed (see JP2009-070099A).

SUMMARY OF THE INVENTION

However, in a case it is possible to accurately extract a target region from a medical image, it is preferable that a doctor perform diagnosis.

However, in the technologies described in JP2007-128127A and JP2009-070099A, the target region is not able to be accurately extracted from the medical image.

The present disclosure has been made in view of the aforementioned circumstances, and an object of the present disclosure is to provide an information processing apparatus, an information processing method, and a program capable of accurately extracting a target region from a medical image.

In order to achieve the aforementioned object, an information processing apparatus of the present disclosure comprises an extraction unit that extracts information indicating a physique of a subject from an image acquired by imaging the subject, a specification unit that specifies a group into which the subject is classified by using the information indicating the physique of the subject extracted by the extraction unit, and a generation unit that generates a learned model for each group using, as an input, image data indicating a medical image acquired by imaging the subject for each group and using, as an output, information indicating a region extracted from the medical image through machine learning using, as learning data, the image data indicating the medical image and the information indicating the region.

The information processing apparatus of the present disclosure may further comprise an input unit that inputs image data indicating the medical image to one learned model acquired in advance through the machine learning using, as the learning data, the image data indicating the medical image and the information indicating the region, and an acquisition unit that acquires the information indicating the region output from the one learned model through the input by the input unit. The generation unit may generate the learned model for each group by causing the one learned model to relearn for each group specified by the specification unit by using, as the learning data, the medical image data input by the input unit and the information indicating the region acquired by the acquisition unit.

In the information processing apparatus of the present disclosure, the information indicating the physique of the subject may be a skeleton of the subject.

In the information processing apparatus of the present disclosure, the information indicating the physique of the subject may be a body surface of the subject.

In the information processing apparatus of the present disclosure, the image used for extracting the information indicating the physique of the subject may be the medical image.

In the information processing apparatus of the present disclosure, the group may be a group into which the subject is classified according to an age, a gender, a race, or a species of the subject.

In order to achieve the aforementioned object, an information processing method by a computer of the present disclosure comprises extracting information indicating a physique of a subject from an image acquired by imaging the subject, specifying a group into which the subject is classified by using the extracted information indicating the physique of the subject, and generating a learned model for each group using, as an input, image data indicating a medical image acquired by imaging the subject for each group and using, as an output, information indicating a region extracted from the medical image through machine learning using, as learning data, the image data indicating the medical image and the information indicating the region.

In order to achieve the aforementioned object, a program of the present disclosure causes computer to execute extracting information indicating a physique of a subject from an image acquired by imaging the subject, specifying a group into which the subject is classified by using the extracted information indicating the physique of the subject, and generating a learned model for each group using, as an input, image data indicating a medical image acquired by imaging the subject for each group and using, as an output, information indicating a region extracted from the medical image through machine learning using, as learning data, the image data indicating the medical image and the information indicating the region.

An information processing apparatus of the present disclosure comprises a memory that stores a command for causing a computer to execute, and a processor that is configured to execute the stored command. The processor extracts information indicating a physique of a subject from an image acquired by imaging the subject, specifies a group into which the subject is classified by using the extracted information indicating the physique of the subject, and generates a learned model using, as an input, image data indicating a medical image acquired by imaging the subject for each group and using, as an output, information indicating a region extracted from the medical image for each group through machine learning using, as learning data, the image data indicating the medical image and the information indicating the region.

According to the present disclosure, it is possible to accurately extract the target region from the medical image.

DESCRIPTION OF THE PREFERRED EMBODIMENTS

Hereinafter, form examples for implementing a technology of the present disclosure will be described in detail.

Figure 1:
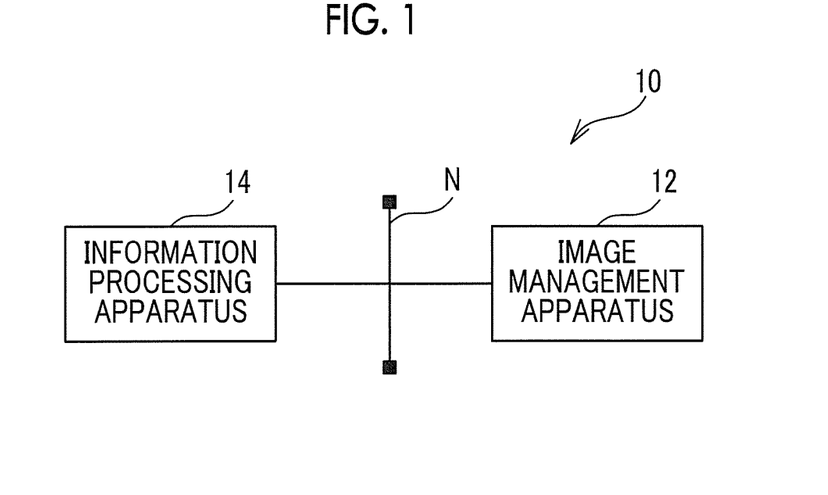
FIG. 1 is a block diagram showing an example of a configuration of a diagnostic support system according to an embodiment.

Initially, a configuration of a diagnostic support system 10 according to the present embodiment will be described with reference to FIG. 1. As shown in FIG. 1, the diagnostic support system 10 includes an image management apparatus 12 and an information processing apparatus 14. The image management apparatus 12 and the information processing apparatus 14 are connected to a network N, and can communicate via the network N. The image management apparatus 12 stores image data (hereinafter, referred to as "medical image data") indicating a medical image acquired by imaging a subject by using an imaging device that images medical images of computed tomography (CT) and magnetic resonance imaging (MRI). Examples of the image management apparatus 12 include a picture archiving and communication system (PACS). The information processing apparatus 14 supports diagnosis by using the medical image data stored in the image management apparatus 12. Examples of the information processing apparatus 14 include a personal computer and a server computer.

Figure 2:
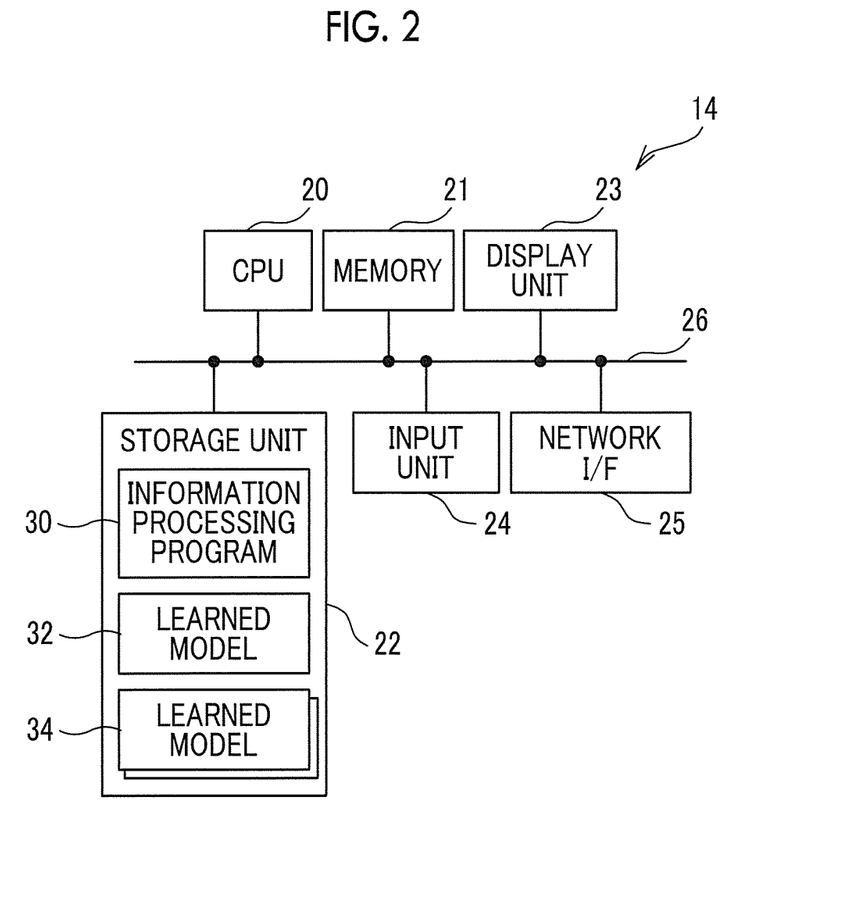
FIG. 2 is a block diagram showing an example of a hardware configuration of an information processing apparatus according to the embodiment.

Next, a hardware configuration of the information processing apparatus 14 according to the present embodiment will be described with reference to FIG. 2. As shown in FIG. 2, the information processing apparatus 14 includes a central processing unit (CPU) 20, a memory 21 as a temporary storage region, and a nonvolatile storage unit 22. The information processing apparatus 14 includes a display unit 23 such as a liquid crystal display, an input unit 24 such as a keyboard and a mouse, and a network interface (I/F) 25 connected to the network N. The CPU 20, the memory 21, the storage unit 22, the display unit 23, the input unit 24, and the network I/F 25 are connected to a bus 26.

The storage unit 22 is implemented by a hard disk drive (HDD), a solid state drive (SSD), and a flash memory. An information processing program 30 is stored in the storage unit 22 as a storage medium. The CPU 20 reads out the information processing program 30 from the storage unit 22, develops the readout information processing program into the memory 21, and executes the developed information processing program 30.

Figure 3:
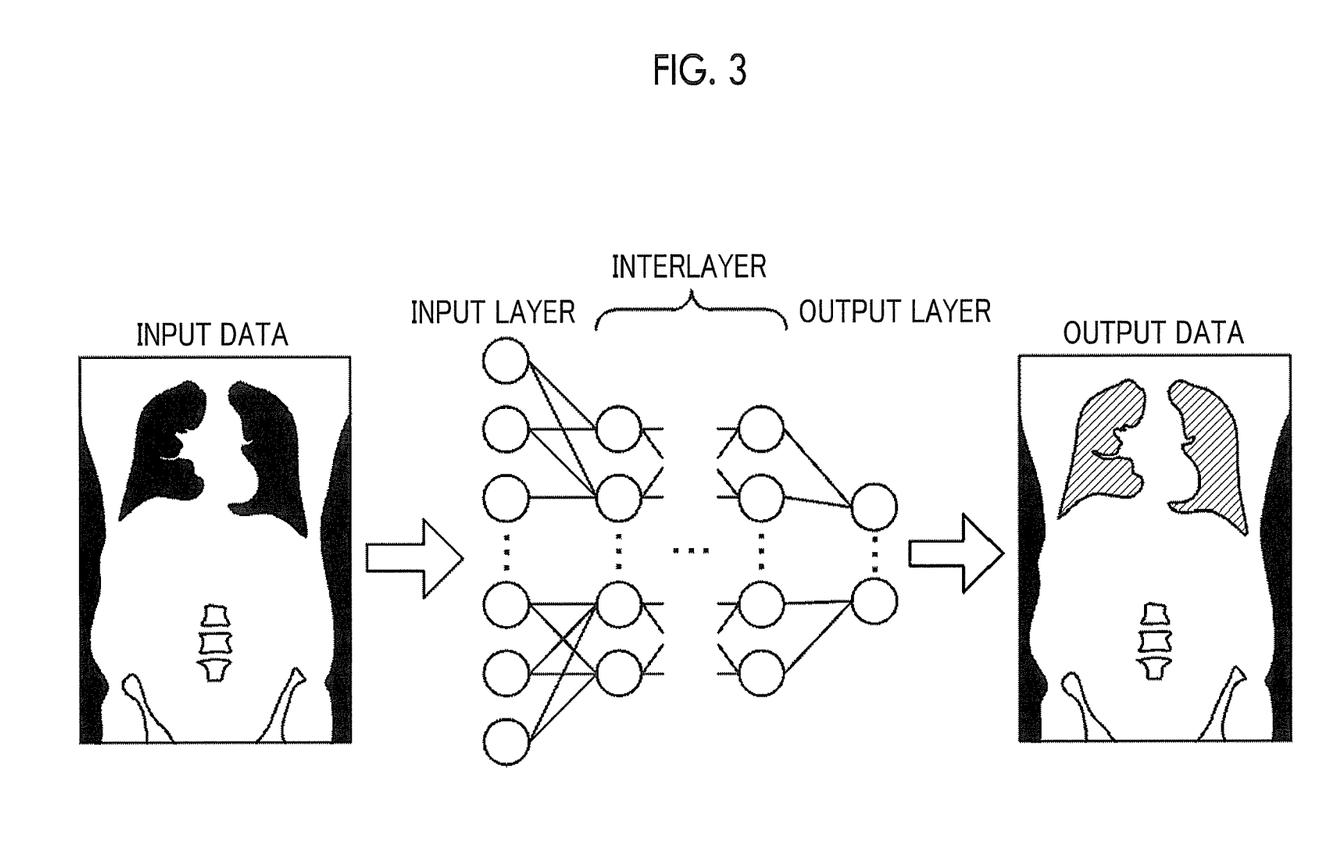
FIG. 3 is a diagram showing an example of a learned model according to the embodiment.

One learned model 32 and a plurality (in the present embodiment, two) of learned models 34 are stored in the storage unit 22. The learned model 32 will be described with reference to FIG. 3. As shown in FIG. 3, a form example in which a neural network including an input layer, a plurality of interlayers, and an output layer is applied as an example of the learned model 32 will be described in the present embodiment.

The medical image data acquired by imaging the subject by using CT is input, as an example of the input data, to the learned model 32. Information indicating regions extracted from the medical image indicated by the input medical image data is output, as an example of output data, from the learned model 32. In the present embodiment, the learned model 32 extracts lung regions on a medical image indicated by the input medical image data, and outputs image data indicating an image acquired by filling the extracted lung regions with a predetermined color (for example, red). In FIG. 3, the extracted lung regions are represented by diagonal regions.

The learned model 32 is a model acquired in advance by machine learning using, as learning data (referred to as training data), multiple sets of medical image data and information indicating the lung regions of the medical image data. Examples of a method used in the machine learning in this case include an error back-propagation method.

The learned model 32 according to the present embodiment is acquired as a general-purpose model in advance without distinguishing between groups, to be described below, into which the subject is classified.

Although a case where the learned model 32 extracts the lung regions on both left and right sides has been described in the present embodiment, the present disclosure is not limited thereto. The learned model 32 may extract the lung region on any one of the left and right sides, may extract regions other than the lung regions, or may extract multiple kinds of regions. Examples of the regions extracted by the learned model 32 include an organ region, a bone region, a blood vessel region, and a subcutaneous fat region.

Similar to the learned model 32, a neural network including an input layer, a plurality of interlayers, and an output layer is also applied to the learned model 34. Similar to the learned model 32, the medical image data acquired by imaging the subject by using CT is also input to the learned model 34, and the information indicating the regions extracted from the medical image indicated by the input medical image data is also output from the learned model 34. The learned model 34 is generated for each group into which the subject is classified by a generation unit 52 to be described below.

Figure 4:
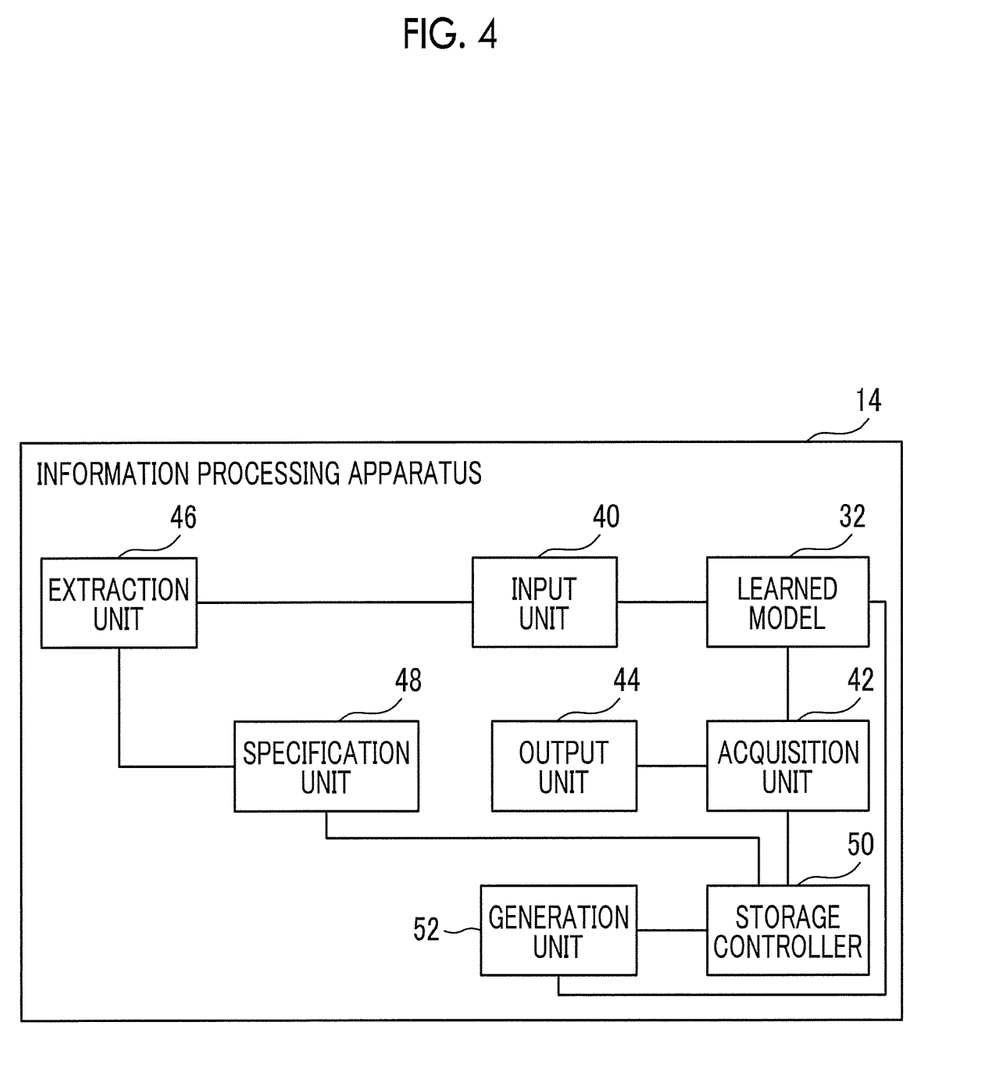
FIG. 4 is a block diagram showing an example of a functional configuration of the information processing apparatus according to the embodiment.

Next, a functional configuration of the information processing apparatus 14 according to the present embodiment will be described with reference to FIG. 4. As shown in FIG. 4, the information processing apparatus 14 includes an input unit 40, an acquisition unit 42, an output unit 44, an extraction unit 46, a specification unit 48, a storage controller 50, and the generation unit 52. The CPU 20 executes the information processing program 30, and thus, the information processing program functions as the input unit 40, the acquisition unit 42, the output unit 44, the extraction unit 46, the specification unit 48, the storage controller 50, and the generation unit 52.

The input unit 40 acquires the medical image data from the image management apparatus 12, and inputs the acquired medical image data to the learned model 32. The acquisition unit 42 acquires the information indicating the regions extracted from the medical image output from the learned model 32 so as to correspond to the input using the input unit 40.

The output unit 44 outputs the information indicating the regions extracted from the medical image acquired by the acquisition unit 42 to the display unit 23. Through this output, for example, an image acquired by filling the lung regions with a predetermined color is displayed on the display unit 23. The user diagnoses the subject by using the image displayed on the display unit 23. The output unit 44 may output (store) the information indicating the regions extracted from the medical image acquired by the acquisition unit 42 to the storage unit 22, and may output (transmit) the information to the image management apparatus 12.

The extraction unit 46 extracts information indicating the physique of the subject from the medical image indicated by the medical image data acquired from the image management apparatus 12 by the input unit 40. In the present embodiment, the extraction unit 46 extracts a skeleton of the subject as the information indicating the physique of the subject by performing image analysis process on the medical image. Specifically, for example, since a signal value of a CT image in a skeleton region is higher than that in another region, the extraction unit 46 extracts the skeleton of the subject by extracting a region in which the signal value is equal to or greater than a threshold value from the medical image. In this case, the extraction unit 46 identifies features of a vertebra and a pelvis of the extracted skeleton, and identifies a head part, a chest part, an abdomen part, or a lower limb part. For example, the threshold value in this case is determined as a lower limit of a value capable of distinguishing between bone regions and other regions of the medical image in advance.

The specification unit 48 specifies the group into which the subject is classified by using the information indicating the physique of the subject extracted by the extraction unit 46. In the present embodiment, the specification unit 48 specifies whether the group into which the subject is classified is a child or an adult by using the skeleton of the subject extracted by the extraction unit 46. Specifically, for example, the specification unit 48 specifies whether the group into which the subject is classified is the child or the adult from a ratio of the hear part to the entire body for the skeleton of the subject. The ratio of the head part to the entire body is equal to or greater than about 15% and is equal to or less than about 25% for children from preschooler to elementary school students, and is less than 15% above high school students. Thus, for example, the threshold value is set to 15%, and thus, it is possible to specify the group into which the subject is classified.

The child mentioned herein means a child below a predetermined age, and the adult is a person of a predetermined age or more. An age of a boundary between the child and the adult is not particularly limited, and may be, for example, 15 years old or 18 years old. The number of groups into which the subject is classified is not limited to two, and may be three or more.

The storage controller 50 performs control for storing the medical image data acquired from the image management apparatus 12 by the input unit 40 and the information indicating the regions extracted from the medical image acquired by the acquisition unit 42 for the medical image data in association with the group specified by the specification unit 48 in the storage unit 22.

The generation unit 52 generates the learned model 34 for each group through the machine learning using, as the learning data, the multiple sets of medical image data items for each group and the information indicating the regions extracted from the medical image stored in the storage unit 22. In the present embodiment, the generation unit 52 causes the learned model 32 to relearn for each group specified by the specification unit 48 by using, as the learning data, the multiple sets of medical image data items for each group and the information indicating the regions extracted from the medical image stored in the storage unit 22. Through the relearning, the generation unit 52 generates the learned model 34 for each group.

That is, in the present embodiment, the generation unit 52 generates the learned model 34 corresponding to the child group and the learned model 34 corresponding to the adult group from one general-purpose learned model 32.

Next, the actions of the information processing apparatus 14 according to the present embodiment will be described with reference to FIGS. 5 and 6. The CPU 20 executes the information processing program 30, and thus, a diagnostic support process shown in FIG. 5 and a relearning process shown in FIG. 6 are performed. For example, the diagnostic support process shown in FIG. 5 is performed in a case where an execution command of the diagnostic support process is input by the user through the input unit 24.

Figure 5:
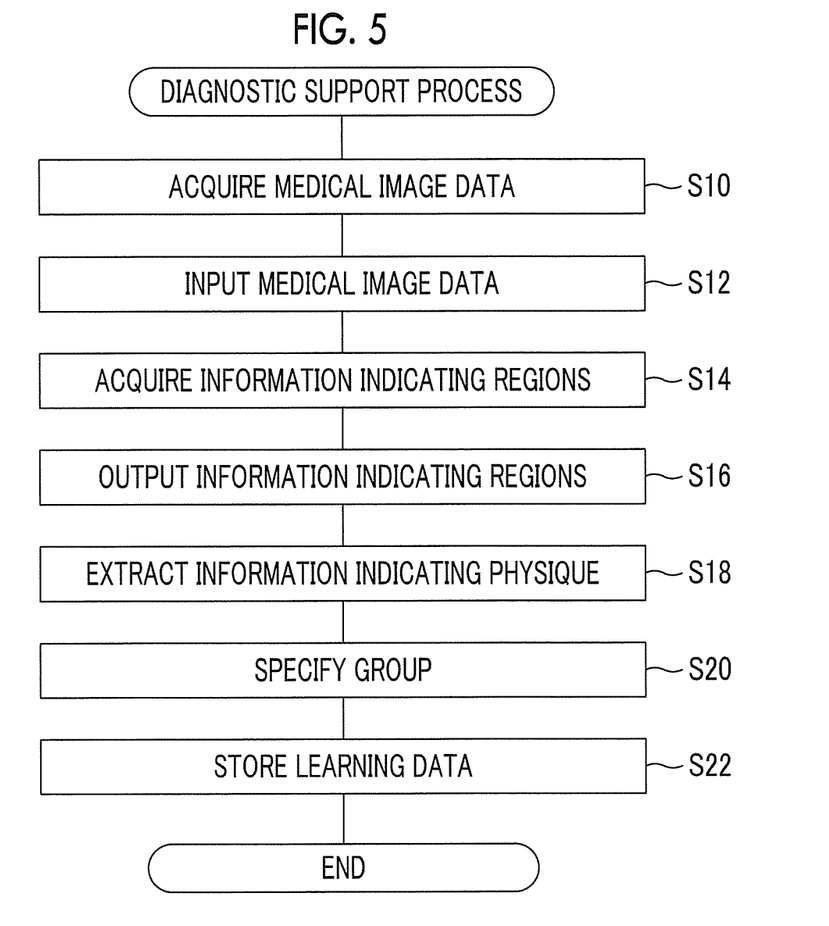
FIG. 5 is a flowchart showing an example of a diagnostic support process according to the embodiment.
Figure 6:
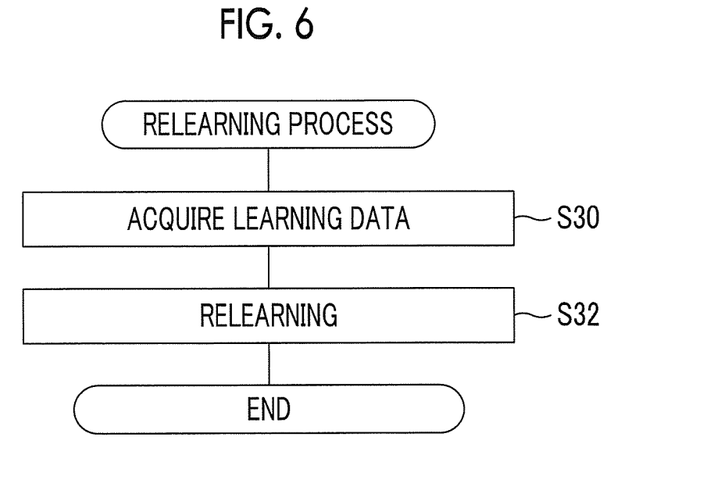
FIG. 6 is a flowchart showing an example of a relearning process according to the embodiment.

In step S10 of FIG. 5, the input unit 40 acquires the medical image data from the image management apparatus 12. In step S12, the input unit 40 inputs the medical image data acquired in step S10 to the learned model 32. In step S14, the acquisition unit 42 acquires the information indicating the regions extracted from the medical image output from the learned model 32 so as to correspond to the input through the process of step S12.

In step S16, the output unit 44 outputs the information indicating the regions extracted from the medical image acquired through the process of step S14 to the display unit 23 as described above. In step S18, the extraction unit 46 extracts the information indicating the physique of the subject from the medical image indicated by the medical image data acquired through the process of step S10, as mentioned above.

In step S20, the specification unit 48 specifies the group into which the subject is classified by using the information indicating the physique of the subject extracted through the process of step S18, as mentioned above. In step S22, the control for storing, as the learning data, the medical image data acquired through the process of step S10 and the information indicating the regions extracted from the medical image acquired through the process of step S14 in association with the group specified through the process of step S20 in the storage unit 22 is performed. In a case where the process of step S22 is ended, the diagnostic support process is ended.

The diagnostic support process shown in FIG. 5 is performed for the medical image data acquired by imaging each subject, and thus, the learning data is accumulated for each group in the storage unit 22. Through the diagnostic support process shown in FIG. 5, in a case where a predetermined number (for example, 100) or more of learning data items are stored for each group in the storage unit 22, the relearning process shown in FIG. 6 is performed. The relearning process shown in FIG. 6 may be performed whenever the learning data is stored in the storage unit 22 through the process of step S22 of FIG. 5, and may be performed when the execution command is input by the user.

In step S30 of FIG. 6, the generation unit 52 acquires the learning data (that is, the medical image data and the information indicating the regions extracted from the medical image) corresponding to the group in which the predetermined number or more of learning data items are stored from the storage unit 22. In step S32, the generation unit 52 generates the learned model 34 corresponding to the group in which the predetermined number or more of learning data items are stored by causing the learned model 32 to relearn by using the learning data acquired in step S30, as stated above. In a case where the process of step S32 is ended, the relearning process is ended. The relearning process shown in FIG. 6 is performed for each group, and thus, the learned model 34 corresponding to each group is generated.

After the learned model 34 is generated for each group, for example, the medical image data is input to the learned model 34 corresponding to the group into which the subject corresponding to the medical image data is classified. Accordingly, it is possible to acquire the information indicating the regions extracted from the medical image indicated by the medical image data.

As described above, according to the present embodiment, the learned model 34 is generated for each group by specifying the group into which the subject is classified by using the information indicating the physique of the subject and performing the machine learning using, as the learning data, the medical image data for each specified group and the information indicating the regions extracted from the medical image.

A radiation dose during imaging, a size of an organ, and a fat amount are different depending on whether the medical image acquired by imaging the subject is the child or the adult. Specifically, the radiation dose during imaging, the organ, and the fat amount in the case of the child are less than those in the case of the adult. Accordingly, as in the present embodiment, it is possible to accurately extract the regions as targets from the medical image by individually generating the learned model 34 corresponding to the child and the learned model 34 corresponding to the adult.

According to the present embodiment, the information indicating the physique of the subject is extracted from the medical image acquired by imaging the subject is not required, and the group into which the subject is classified is specified by using the extracted information. Accordingly, a dedicated image for extracting the physique of the subject, and it is possible to specify the group without the user specifying the group. As a result, it is possible to efficiently specify the group into which the subject is classified.

Although it has been described in the embodiment that the learned model 34 is generated by causing the learned model 32 to relearn, the present disclosure is not limited thereto. The learned model 34 may be generated for each group from the beginning through the machine learning using, as the learning data, the medical image data for each group and the information indicating the regions extracted from the medical image.

Although it has been described in the embodiment that the skeleton of the subject is applied as the information indicating the physique of the subject, the present disclosure is not limited thereto. For example, a body surface of the subject may be applied as the information indicating the physique of the subject. In this case, a form in which the specification unit 48 derives a waist measurement and a shoulder width of the subject from the extracted body surface of the subject and the group into which the subject is classified is specified from the derived physique of the subject such as the waist measurement and the shoulder width is illustrated. In this case, for example, it is possible to apply a determination criteria of a metabolic syndrome as a threshold value for specifying a gender.

Although it has been described in the embodiment that the group (in the embodiment, the child or the adult) into which the subject is classified according to the age of the subject is applied as the group into which the subject is classified, the present disclosure is not limited thereto. For example, as the group into which the subject is classified, the group into which the subject is classified according to the gender of the subject may be applied, or the group into which the subject is classified according to the race of the subject may be applied. For example, as the group into which the subject is classified, the group into which the subject is classified according to species of the subject such as a human, a dog, and a cat may be applied. The subject may be classified according to a plurality of combinations of the aforementioned examples. In this case, a form in which the subject is classified into the group according to the combination of the age and gender of the subject like "child•male", "child•female", "adult•male", and "adult•female" is illustrated.

For example, a shape of a central hole of the pelvis is similar to a triangle for men, and is similar to a circle for women. Accordingly, it is possible to specify the gender of the subject from the shape of the central hole of the pelvis. For example, it is possible to specify whether or not the subject is a human or an animal other than the human from the total number of bones, the presence or absence of a tail bone, and the number of teeth.

Although it has been described in the embodiment that the information indicating the physique of the subject is extracted from the medical image, the present disclosure is not limited thereto. For example, a form in which the information indicating the physique of the subject is extracted from the image captured by an imaging device other than the medical imaging device may be used. In this case, a form in which the body surface of the subject is extracted from the image by performing an image analysis process for the image acquired by imaging the subject by a digital camera is illustrated.

In the embodiment, after the learned model 34 is generated, in a case where the group into which the subject is classified is not able to be specified from the medical image, the learned model 32 may be used.

In the embodiment, for example, various processors to be described below can be used as hardware structures of the processing units that perform various processes such as the input unit 40, the acquisition unit 42, the output unit 44, the extraction unit 46, the specification unit 48, the storage controller 50, and the generation unit 52. As stated above, examples of various processors include a programmable logic device (PLD) such as a field-programmable gate array (FPGA) which is a processor of which a circuit configuration can be changed after being manufactured, a dedicated electric circuit such as an application specific integrated circuit (ASIC) which is a processor having a circuit configuration designed as a dedicated circuit in order to perform a specific process in addition to the CPU which is a general-purpose processor functioning as various processing units by executing software (program).

One processing unit may be constituted by one of these various processors, or may be constituted by a combination (for example, a combination of a plurality of FPGAs or a combination of the CPU and the FPGA) of the same kind or different kinds of two or more processors. Alternatively, the plurality of processing units may be constituted by one processor.

Firstly, as the example in which the plurality of processing units is constituted by one processor, there is a form in which one processor is constituted by a combination of one or more CPUs and software and this processor functions as the plurality of processing units as represented by computers such as a client and a server. Secondly, there is a form in which a processor that implements the entire system function including the plurality of processing units by one integrated circuit (IC) chip as represented by a system on chip (SoC) is used. As stated above, various processing units are constituted as hardware structure by using one or more of various processors.

More specifically, an electric circuitry acquired by combining circuit elements such as semiconductor elements can be used as the hardware structure of these various processors.

Although the aspect in which the information processing program 30 is stored (installed) in advance in the storage unit 22 has been described in the embodiment, the present disclosure is not limited thereto. The information processing program 30 may be provided while being recorded in a recording medium such as a compact disc read only memory (CD-ROM), a digital versatile disc read only memory (DVD-ROM), and a universal serial bus (USB) memory. The information processing program 30 may be downloaded from an external device via a network.

EXPLANATION OF REFERENCES

- 10: diagnostic support system
- 12: image management apparatus
- 14: information processing apparatus
- 20: CPU
- 21: memory
- 22: storage unit
- 23: display unit
- 24: input unit
- 25: network I/F
- 26: bus
- 30: information processing program
- 32, 34: learned model
- 40: input unit
- 42: acquisition unit
- 44: output unit
- 46: extraction unit
- 48: specification unit
- 50: storage controller
- 52: generation unit
- N: network

What is claimed is:

1. An information processing apparatus comprising:
   a processor, configured to:
   extract information indicating a physique of a target subject from an image acquired by imaging the target subject;
   specify a group into which the target subject is classified by using the extracted information indicating the physique of the target subject; and
   generate a learned model for each of a plurality of groups using, as an input, image data indicating medical images acquired by imaging a plurality of subjects for each of the groups and using, as an output, information indicating a region extracted from each of the medical images through machine learning using, as learning data, the image data indicating the medical images and the information indicating the regions, wherein the learned model for each of the groups respectively corresponds to a different physique.

2. The information processing apparatus according to claim 1, wherein the processor is further configured to:
   input image data indicating the medical images to one learned model acquired in advance through the machine learning using, as the learning data, the image data indicating the medical images and the information indicating the regions; and
   acquire the information indicating the regions output from the one learned model,
   wherein the processor generates the learned model for each of the groups by causing the one learned model to relearn for each of the groups by using, as the learning data, the medical image data and the information indicating the regions.

3. The information processing apparatus according to claim 1,
   wherein the extracted information indicating the physique of the target subject is a skeleton of the target subject.

4. The information processing apparatus according to claim 1,
   wherein the extracted information indicating the physique of the target subject is a body surface of the target subject.

5. The information processing apparatus according to claim 1,
   wherein the image used for extracting the information indicating the physique of the target subject is a medical image of the target subject.

6. The information processing apparatus according to claim 1,
   wherein the specified group is a group into which the target subject is classified according to an age, a gender, a race, or a species of the target subject.

7. The information processing apparatus according to claim 1, wherein the processor is further configured to:
   extract a target region from the image by using the learned model corresponding to the specified group.

8. An information processing method comprising:
   extracting information indicating a physique of a target subject from an image acquired by imaging the target subject;
   specifying a group into which the target subject is classified by using the extracted information indicating the physique of the target subject; and
   generating a learned model for each of a plurality of groups using, as an input, image data indicating medical images acquired by imaging a plurality of subjects for each of the groups and using, as an output, information indicating a region extracted from each of the medical images through machine learning using, as learning data, the image data indicating the medical images and the information indicating the regions, wherein the learned model for each of the groups respectively corresponds to a different physique.

9. A non-transitory computer readable medium storing a program causing a computer to execute a process comprising:
   extracting information indicating a physique of a target subject from an image acquired by imaging the target subject;
   specifying a group into which the target subject is classified by using the extracted information indicating the physique of the target subject; and
   generating a learned model for each of a plurality of groups using, as an input, image data indicating medical images acquired by imaging a plurality of subjects for each of the groups and using, as an output, information indicating a region extracted from each of the medical images through machine learning using, as learning data, the image data indicating the medical images and the information indicating the regions, wherein the learned model for each of the groups respectively corresponds to a different physique.

* * * * *